United States Patent
Hoch et al.

(10) Patent No.: US 12,539,803 B2
(45) Date of Patent: Feb. 3, 2026

(54) SECUREMENT DEVICE

(71) Applicant: HOCH BRANDS LLC, Boca Raton, FL (US)

(72) Inventors: Bruce A. Hoch, Boca Raton, FL (US); Charles V. Hoch, Boca Raton, FL (US)

(73) Assignee: Hoch Brands, LLC, Boca Raton, FL (US)

( * ) Notice: Subject to any disclaimer, the term of this patent is extended or adjusted under 35 U.S.C. 154(b) by 788 days.

(21) Appl. No.: 17/751,799

(22) Filed: May 24, 2022

(65) Prior Publication Data
US 2023/0049411 A1 Feb. 16, 2023

(51) Int. Cl.
*B60P 7/08* (2006.01)
*B60P 3/079* (2006.01)

(52) U.S. Cl.
CPC ............ *B60P 7/0869* (2013.01); *B60P 3/079* (2013.01); *B60P 7/0823* (2013.01); *B60P 7/0853* (2013.01)

(58) Field of Classification Search
CPC ..... B60P 7/0823; B60P 7/0876; B60P 7/0853; B60P 7/0869; B62J 7/08; A44B 11/00; F41C 33/046; B64D 17/30; A62B 35/0018; A62B 35/0025; A62B 35/0031; A62B 1/16; A62B 35/0037; A47D 13/025; A61G 7/0123; B65D 71/02; B65D 71/04; B65D 63/06
See application file for complete search history.

(56) References Cited

U.S. PATENT DOCUMENTS

| | | | |
|---|---|---|---|
| 312,264 A | 2/1885 | Freeman et al. | |
| 3,739,961 A | 6/1973 | Soukeras | |
| 4,750,652 A | 6/1988 | Grant | |
| 5,050,924 A * | 9/1991 | Hansen | B60P 7/0876 410/97 |
| 5,161,824 A * | 11/1992 | Li | B60R 22/14 280/808 |
| 5,423,428 A * | 6/1995 | Selz | B60P 7/0869 206/386 |
| D426,065 S | 6/2000 | Deveaux | |
| 6,152,342 A | 11/2000 | Suk | |
| 6,283,350 B1 | 9/2001 | Gottmeier et al. | |
| 6,460,747 B1 | 10/2002 | Tuerschmann et al. | |
| 7,131,534 B2 | 11/2006 | Enes | |
| 8,584,323 B2 | 11/2013 | Pang | |
| D703,027 S | 4/2014 | Vick et al. | |
| D707,449 S | 6/2014 | Enes | |
| D707,450 S | 6/2014 | Enes | |
| D810,443 S | 2/2018 | Burgess et al. | |

(Continued)

OTHER PUBLICATIONS

"LYNX Hooks Fully Adjustable Interlocking Tie-down Straps Beats Bungee Cord", YouTube video, posted Jan. 10, 2013, http:linxhooks.com (website not currently available).

(Continued)

*Primary Examiner* — Daniel J Colilla
(74) *Attorney, Agent, or Firm* — Dorsey & Whitney LLP

(57) ABSTRACT

In one embodiment, a securement device includes a main body including a first restraint defined in the main body, a second restraint defined in the main body. The first and second restraint are disposed along separate respective restraint axes, the first restraint is adapted to receive a first flexible element, and the second restraint is adapted to receive a second flexible element.

20 Claims, 17 Drawing Sheets

(56) References Cited

U.S. PATENT DOCUMENTS

| | | | |
|---|---|---|---|
| D844,994 S | 4/2019 | Pacha | |
| 10,245,486 B2 | 4/2019 | Burgess et al. | |
| D848,743 S | 5/2019 | Grote | |
| 10,610,002 B2 | 4/2020 | Pacha et al. | |
| D890,524 S | 7/2020 | Pacha et al. | |
| 10,932,545 B2 | 3/2021 | Pacha et al. | |
| D922,299 S | 6/2021 | Welsh | |
| D942,841 S | 2/2022 | Hoch et al. | |
| 2005/0067221 A1* | 3/2005 | Wolner | A62B 35/0031 182/3 |
| 2010/0200329 A1* | 8/2010 | Johnson | A62B 35/0025 182/3 |
| 2013/0008742 A1* | 1/2013 | Schurian | A62B 35/0031 182/3 |
| 2019/0320780 A1* | 10/2019 | Pacha | A63B 55/408 |
| 2020/0345097 A1* | 11/2020 | Castiglione | A42B 3/14 |
| 2020/0376354 A1 | 12/2020 | Martell | |

OTHER PUBLICATIONS

CB Adventure Supply, "The Perfect Bungee Adjustable Flex-Web Cargo Net", https://www.cbadventuresupply.com/products/the-perfect-bungee-adjustable-flex-web-cargo-net.

* cited by examiner

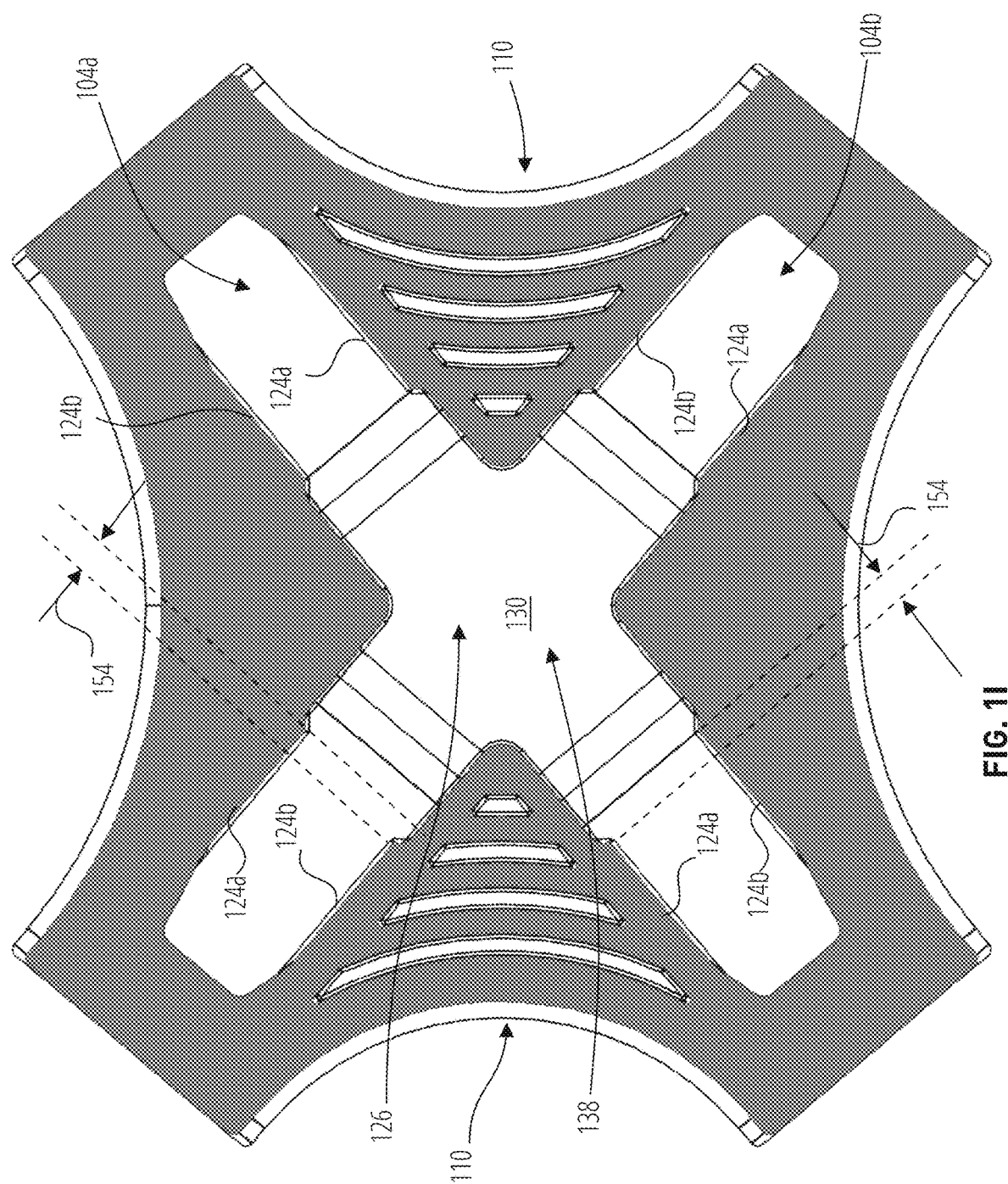

SECUREMENT DEVICE

CROSS-REFERENCE TO RELATED APPLICATIONS

This application is related to U.S. Design patent application Ser. No. 29/803,211, filed 11 Aug. 2021, entitled "Securement Device," and now issued as US Design Patent No. D942,841, which is hereby incorporated by reference for all purposes.

FIELD

This disclosure generally relates to devices adapted to secure a cargo load to a vehicle or other object.

BACKGROUND

Securing items to one another, such as securing a cargo load to a vehicle for transport using straps is common. However, known straps (e.g., ratchet straps, bungee cords, cinch straps, etc.) have certain disadvantages such as the straps slipping off or around the load, causing the load to become unsecure. Many risks are associated with unsecured cargo. For example, unsecured cargo can fall off a vehicle causing a road hazard that can hit, or be hit by, other vehicles. Additionally, the cargo may be damaged due to vibrations or relative movement to the cargo area that causes wear, scratches, rubbing, etc. The cargo may also shift, adversely affecting the balance of the vehicle carrying the cargo and causing unpredictable steering, handling, acceleration, and/or braking. Devices and methods are therefore desirable which can overcome the limitations of known straps and other securement devices.

BRIEF SUMMARY

A securement device is disclosed. In one embodiment, a securement device includes a main body including a first restraint defined in the main body, a second restraint defined in the main body. The first and second restraint are disposed along separate respective restraint axes, the first restraint is adapted to receive a first flexible element, and the second restraint is adapted to receive a second flexible element.

Optionally, in some embodiments, the restraints include, at least in part a base wall, one or more respective side walls, and a web portion extending between opposing respective side walls.

Optionally, in some embodiments, the main body further comprises a self-centering element that automatically biases the main body toward an equilibrium position when the first flexible element and the second flexible element are tensioned.

Optionally, in some embodiments, the self-centering element comprises the one or more side walls, the base wall, and the web portions.

Optionally, in some embodiments, the respective restraints form a channel through at least a portion of the main body.

Optionally, in some embodiments, the main body further includes a plurality of arms extending from a central portion thereof.

Optionally, in some embodiments, the first restraint extends through a first pair of arms of the plurality of arms and the second restraint extends through a second pair of the plurality of arms.

Optionally, in some embodiments, the main body further includes a transition portion that connects from a first arm in the first pair of arms to an adjacent first arm in the second pair or arms.

Optionally, in some embodiments, the main body includes an intersection portion where the first restraint and the second restraint at least partially overlap.

Optionally, in some embodiments, the intersection portion is adapted such that the flexible elements at least partially overlap inside the intersection portion.

Optionally, in some embodiments, the main body further includes a first flange that protrudes at least partially into at least one of the first restraint or the second restraint from a side wall thereof.

Optionally, in some embodiments, the main body further includes a second flange protrudes at least partially into the at least one of the first restraint or the second restraint from a side wall thereof in a position opposing the first flange.

Optionally, in some embodiments, the web portion defines a first aperture in a respective end portion of the first and second restraints, and in communication with the respective restraints.

Optionally, in some embodiments, a second aperture is defined at opposing end portions of each of the first restraint and the second restraint from the first aperture.

Optionally, in some embodiments, the apertures are adapted to receive one of the first flexible element or the second flexible element.

Optionally, in some embodiments, the main body includes a grip element integrally formed with one of a top face or a bottom face thereof.

Optionally, in some embodiments, the restraint axes are disposed at an offset angle with respect to one another.

Optionally, in some embodiments, the offset angle includes an angle of greater than 0 up to and including 90 degrees.

Optionally, in some embodiments, the first restraint limits movement of the main body with respect to the first flexible element to a first direction.

Optionally, in some embodiments, the second restraint limits movement of the main body with respect to the second flexible element to a second direction.

Optionally, in some embodiments, the first direction and the second direction define a coordinate plane and the main body is moveable in at least two degrees of freedom in the coordinate plane when the first flexible element and the second flexible element are un-tensioned.

Optionally, in some embodiments, when the first flexible element is tensioned in the first direction, the tension reduces movement of the second flexible element along the second direction.

A system is disclosed. In one embodiment, the system includes any of the securement devices disclosed above; the first flexible element; and the second flexible element.

A securement device is disclosed. In one embodiment the securement device includes a main body with a first restraint defined by the main body and including a base wall, one or more respective side walls, and a web portion extending between opposing respective side walls; a second restraint defined by the main body and including, at least in part, the base wall, the one or more respective side walls, and a second web portion extending between opposing respective side walls. A least one web portion has a receptacle formed therein and adapted to receive a flexible element.

In another embodiment, a securement device includes a curved main body with a first restraint defined by the main body and including, at least in part, a base wall, one or more respective side walls, and a web portion extending between opposing respective side walls; and a second restraint defined by the main body and including, at least in part, the base wall, the one or more respective side walls, and a second web portion extending between opposing respective side walls.

BRIEF DESCRIPTION OF THE SEVERAL VIEWS OF THE DRAWINGS

FIG. 1I is a section view of the securement device of FIG. 1A taken along line 1I-1I of FIG. 1H.

DETAILED DESCRIPTION

Disclosed herein are examples of securement devices. The securement devices aid in securing cargo or other load to a vehicle or other surface, overcoming limitations of known straps (e.g., ratchet straps, bungee cords, cinch straps, tie downs, ropes, chains, etc.). The securement devices are adapted to apply self-centering compression over a load to reduce or prevent the load from becoming unsecured, for example due to vehicle movement, acceleration, deceleration, turning, vibration, shifting of the load, etc. In some aspects the securement devices may provide slip resistance relative to the load to also reduce or prevent the load from becoming unsecured.

The securement devices have a main body with at least two restraints formed therein, therewith, or coupled thereto. For example, the restraints may be formed of channels that extend through the main body from one edge of the main body to another side of the main body. In other examples, the restraints may be loops or passages that extend outward from a face of the main body. The restraints are adapted to receive respective flexible elements. In the examples shown, the restraints are channels adapted to receive at least one flexible element such as a strap, cord, rope, chain, etc. The restraints may intersect within the main body and thus cause the received flexible elements to intersect and at least partially overlap. In other examples, the restraints may not intersect and the received flexible elements may not intersect or overlap. The restraints are disposed such that when tension is applied to the flexible elements received in the restraints, and the securement device is placed in contact with a load 101, the securement device automatically self-centers on the load 101 to securely couple the load 101 to the vehicle or other object. In other embodiments, the main body 102 may include 3, 4, 5, 6, 7, 8 or more restraints adapted to receive respective flexible elements 106. Such embodiments, may provide for additional load securement and/or adaptability to different loads, when desired.

Figure 1A:
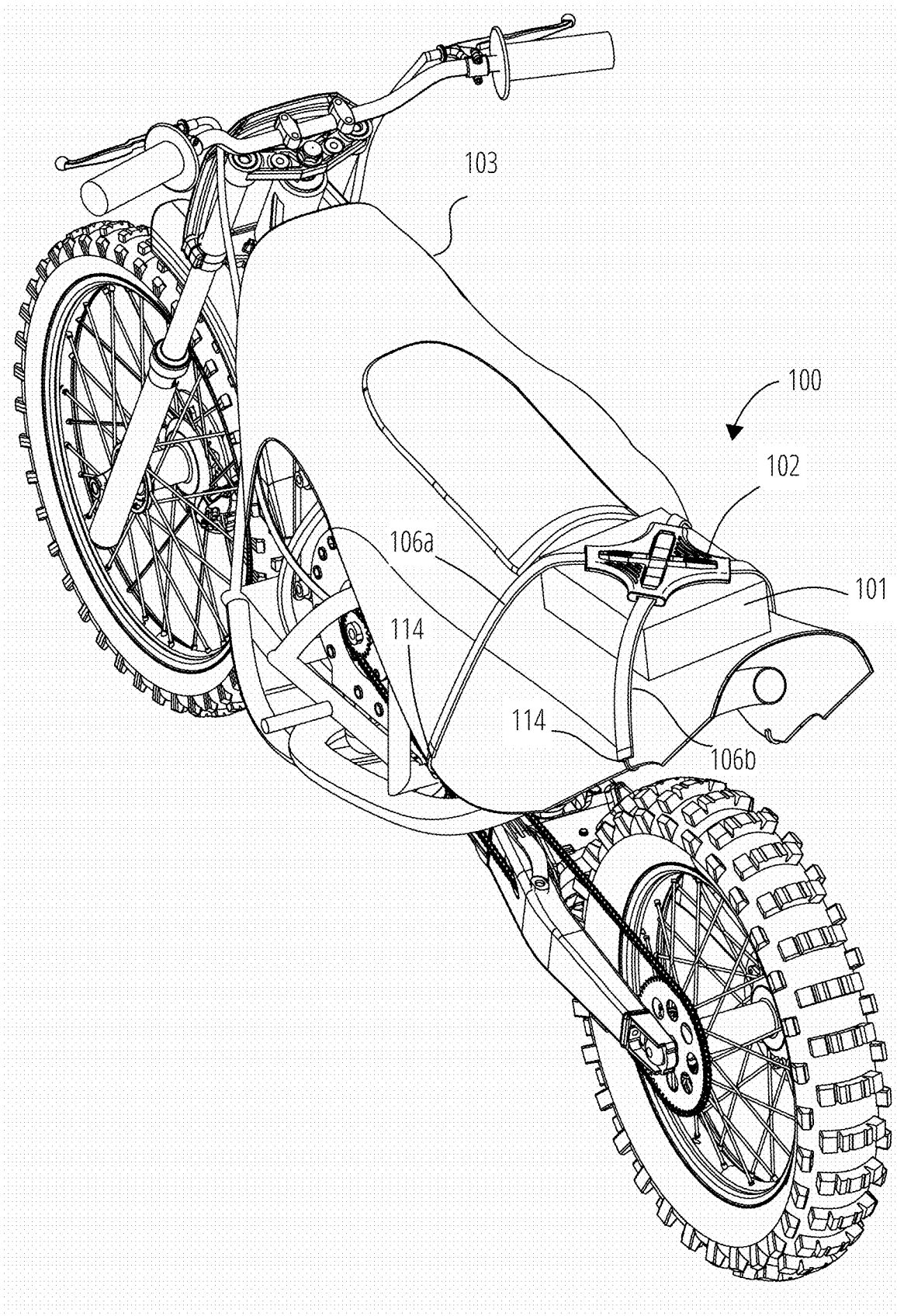
FIG. 1A is a top rear isometric view of an embodiment of a securement device coupling a cargo load to a vehicle.
Figure 1B:
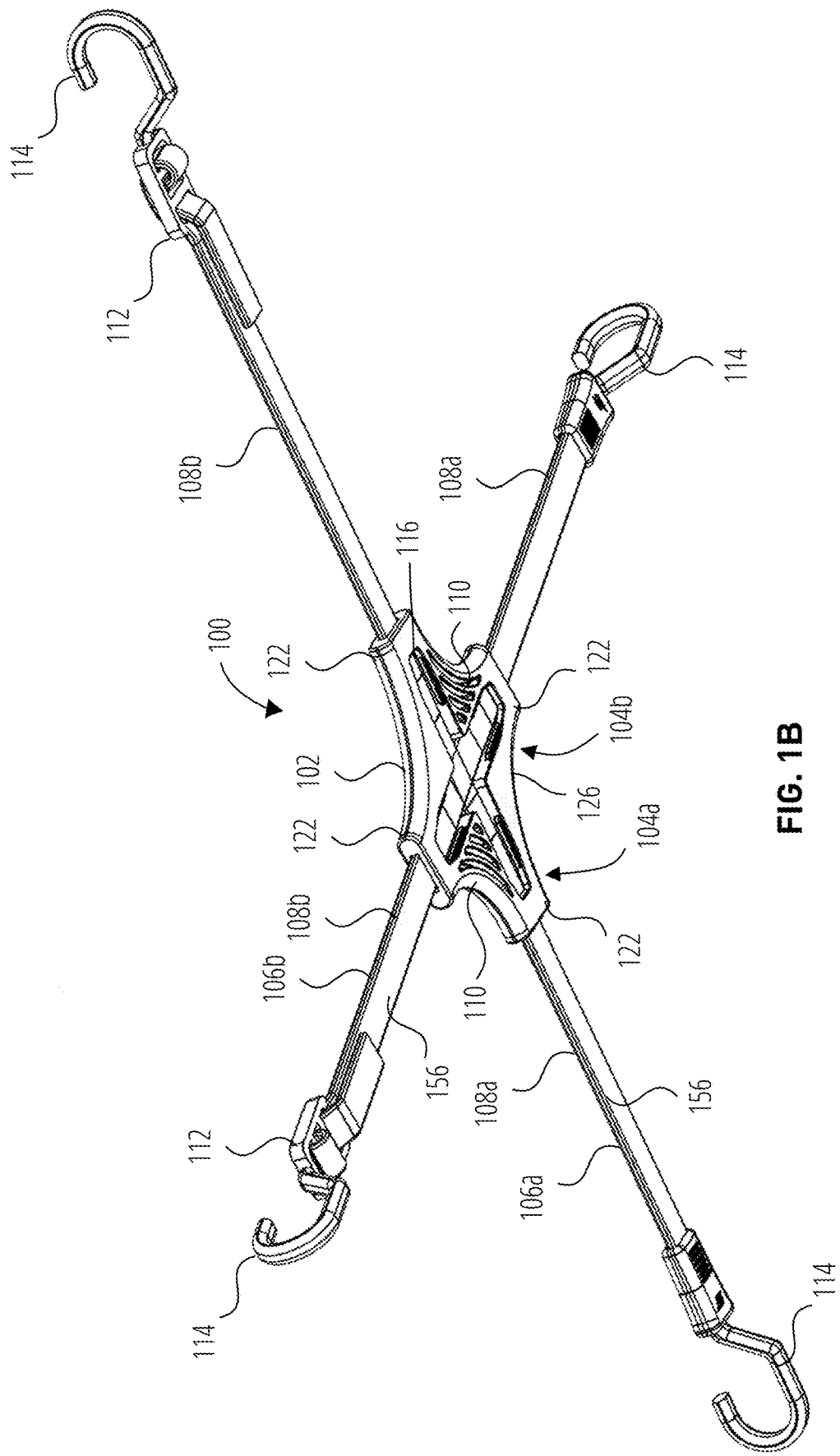
FIG. 1B is a top isometric view of an embodiment of the securement device of FIG. 1A.
Figure 1C:
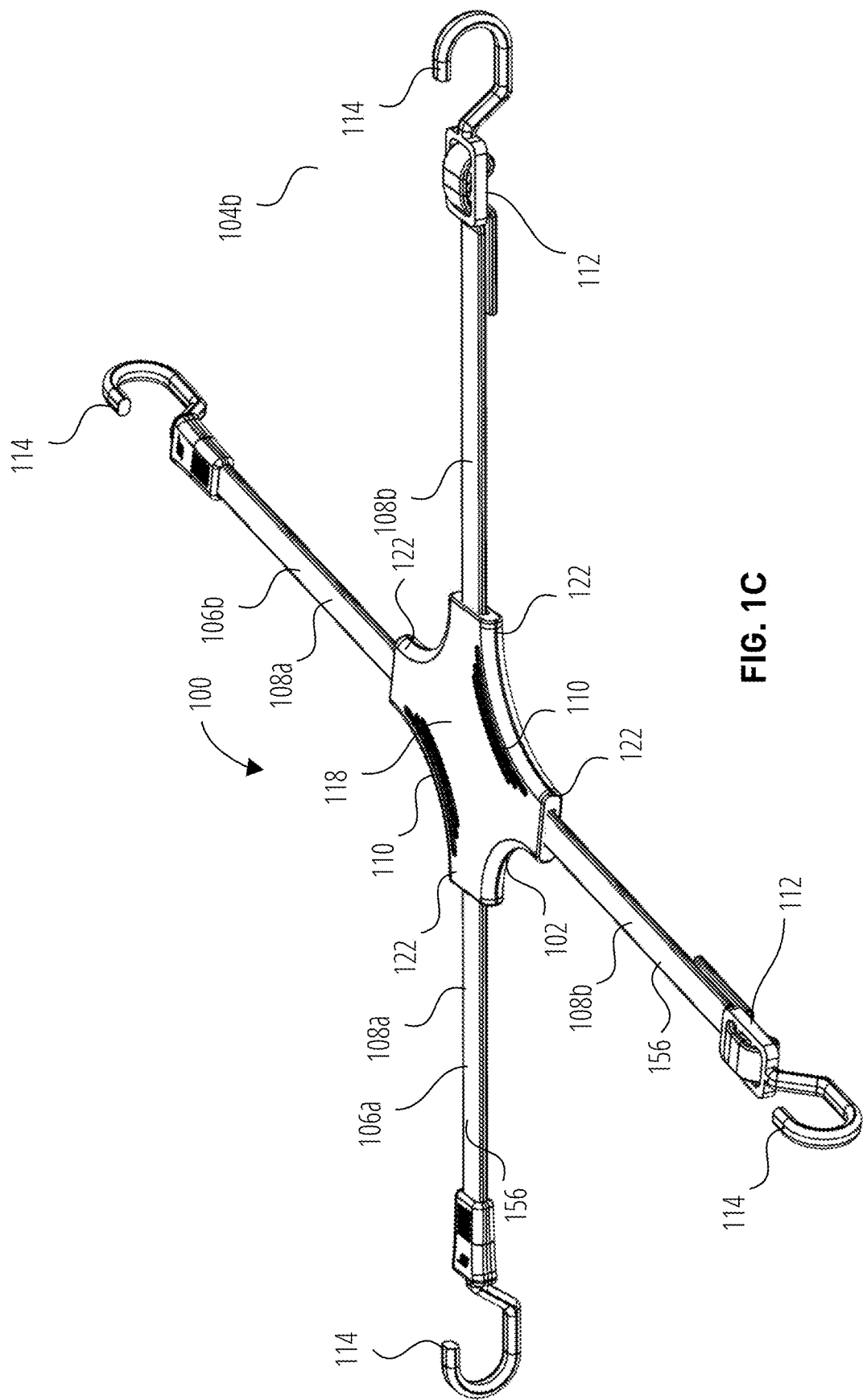
FIG. 1C is a bottom isometric view of the securement device of FIG. 1A.

With reference to FIG. 1A-FIG. 1K, an embodiment of a securement device 100 is disclosed. FIG. 1A shows an embodiment of a securement device 100 coupling a cargo load 101 to a vehicle 103. While the exemplary vehicle in FIG. 1A is a motorcycle, the securement device is suitable to secure a variety of loads 101 to a variety of vehicles 103 (e.g., a truck, car, trailer, all-terrain vehicle, etc.) or other objects. The securement device 100 has a thin main body 102. The thin body extends between a top face 116 and a bottom face 118 a depth distance less than a width or length dimension of either of the faces. In other embodiments, the securement device 100 may have a prismatic, spherical, curved, or other shape of main body 102. In some embodiments, the main body 102 may include a central portion 138. The central portion 138 may have at least two sets of arms 122 extending radially outward therefrom. In the example of the securement device 100 shown, the main body 102 has a central portion 138 with four arms 122-d extending outward therefrom. In some examples, the central portion 138 may be integrally formed in or near the center of the main body 102 and coupled to one or more transition portions 132 that extends between adjacent arms 122. The transition portions 132 may be formed in a variety of shapes such as curves, sharp angles, chamfers, polygons, or irregular shapes. The transition portion 132 may connect from the first arm 122 in a pair of arms to an adjacent first arm 122 in a second pair of arms. One or more transition portions 132 may continue around the perimeter of the central portion 138 of the main body 102. In other embodiments, the main body 102 may have a rectangular, square, round, other polygonal, or irregular shape and may, or may not, have arms.

The main body 102 may be comprised a material that can at least partially conform to the load when the flexible elements 106a-b are tensioned. Additionally, or alternately, the material of the main body 102 may have an anti-slip property, such as a high coefficient of friction to reduce or prevent slippage of the main body 102 with respect to the load 101. In some examples, the main body 102 has an elastic property. In some examples, the main body 102 is formed of an elastomer. Some example elastomers include nitrile butadiene rubber, butadiene rubber, styrene-butadiene rubber, ethylene propylene diene monomer, silicone, natural rubber, vulcanized rubber, etc. In other examples, the main body 102 may be formed of a plastic such as a thermoplastic or thermoset. In other examples, the main body may be formed from a metal, wood or other plant fiber, stone, ceramic, etc. The main body 102 may be formed of combinations of these and other materials.

With particular reference to FIG. 1B and FIG. 1E-FIG. 1H, the main body 102 includes a restraint 104a and a restraint 104b. The restraint 104a and restraint 104b may be adapted to receive at least one respective flexible elements 106a within the main body 102. The restraint 104a and restraint 104b may intersect at an intersection portion 126. Thus the flexible elements 106a-b that pass through the respective restraints 104a-b may at least partially overlap.

Turning again to FIG. 1B-FIG. 1D, respective flexible element 106a and flexible element 106b may be received in the restraints 104a-b. The flexible element 106a and flexible element 106b may be straps, elastic cords, ropes, chains, etc. The flexible elements 106a-b may include an elongated portion 156. The elongated portion 156 may be formed of a fibrous material, filament material, woven material, elastomer material, metal, chain, etc. In some embodiments, the elongated portion 156 may be sufficiently elastic to stretch over a load 101. In other embodiments, the (e.g., chain or metal strips) the elongated portion 156 may flex in a transverse direction (e.g., normal to the length of the elongated portion 156) but may be relatively inelastic in a longitudinal direction (e.g., along the length dimension of the elongated portion 156). The flexible elements 106a-b may have attachment structures 114 at one or both end portions, and/or along the length thereof. The attachment structures 114 may be hooks (as shown for example in the figures), or may be loops, rings, t-bars, "e-track" connectors, or like structures that can secure the flexible elements 106a to a vehicle 103 or other object and resist tension in the flexible element 106a-b. The length of the flexible element 106a-b may be adjustable by one or more length adjusters 112. Length adjusters 112 may be buckles, ratchets, cinches, knots (e.g., Prussik knots) or any other device that can be used to change a length of the elongated portion 156 of the flexible element 106a-b and/or induce tension in the flexible element 106a-b.

The restraints 104a-b may limit the movement of the respective flexible elements 106a-b received therein. For example, the restraints 104a-b may limit the movement of the respective flexible elements 106a-b in two dimensions, while leaving the flexible elements 106a-b free in a third dimension. In other words, the restraints 104a-b may limit the flexible elements 106a-b to one degree of freedom. As shown best in FIG. 1D, the flexible elements 106a-b may be slidably received in the respective restraints 104a-b. For example, the flexible element 106a may be able to slide through the restraint 104a in a first direction 160 and the flexible element 106b may be able to slide through the restraint 104b in a second direction 162. The first direction 160 and second direction 162 may be disposed at an offset angle 134 with respect to one another, as discussed further below.

When received in a restraint 104a-b, a respective flexible element 106a-b may have a first portion 108a extending from one edge of the main body 102 and second portion 108b extending from an opposite edge of the main body 102. The flexible element 106a-b may slide in the free dimension (e.g., along the plane of the main body 102) along the single degree of freedom through the respective restraints 104a-b. Thus, the respective first portion 108a and second portion 108b may lengthen or shorten as the flexible element 106a-b is slid with respect to the main body 102. A benefit of such slidable motion is that the securement device 100 may be adapted to a wide variety of loads 101 and or vehicles 103 or other objects to which the load 101 may be secured.

Figure 1D:
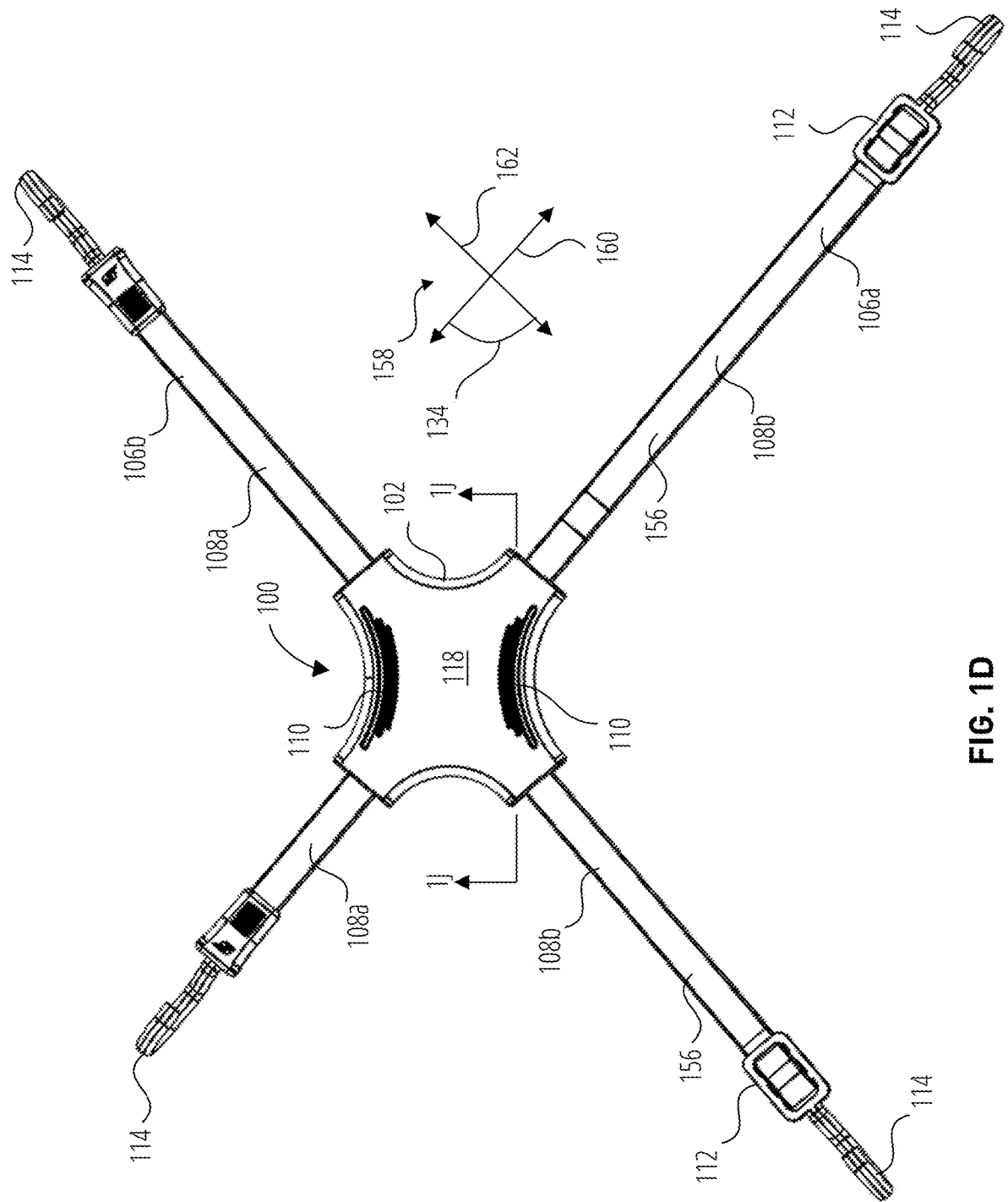
FIG. 1D is a bottom plan view of the securement device of FIG. 1A.
Figure 1E:
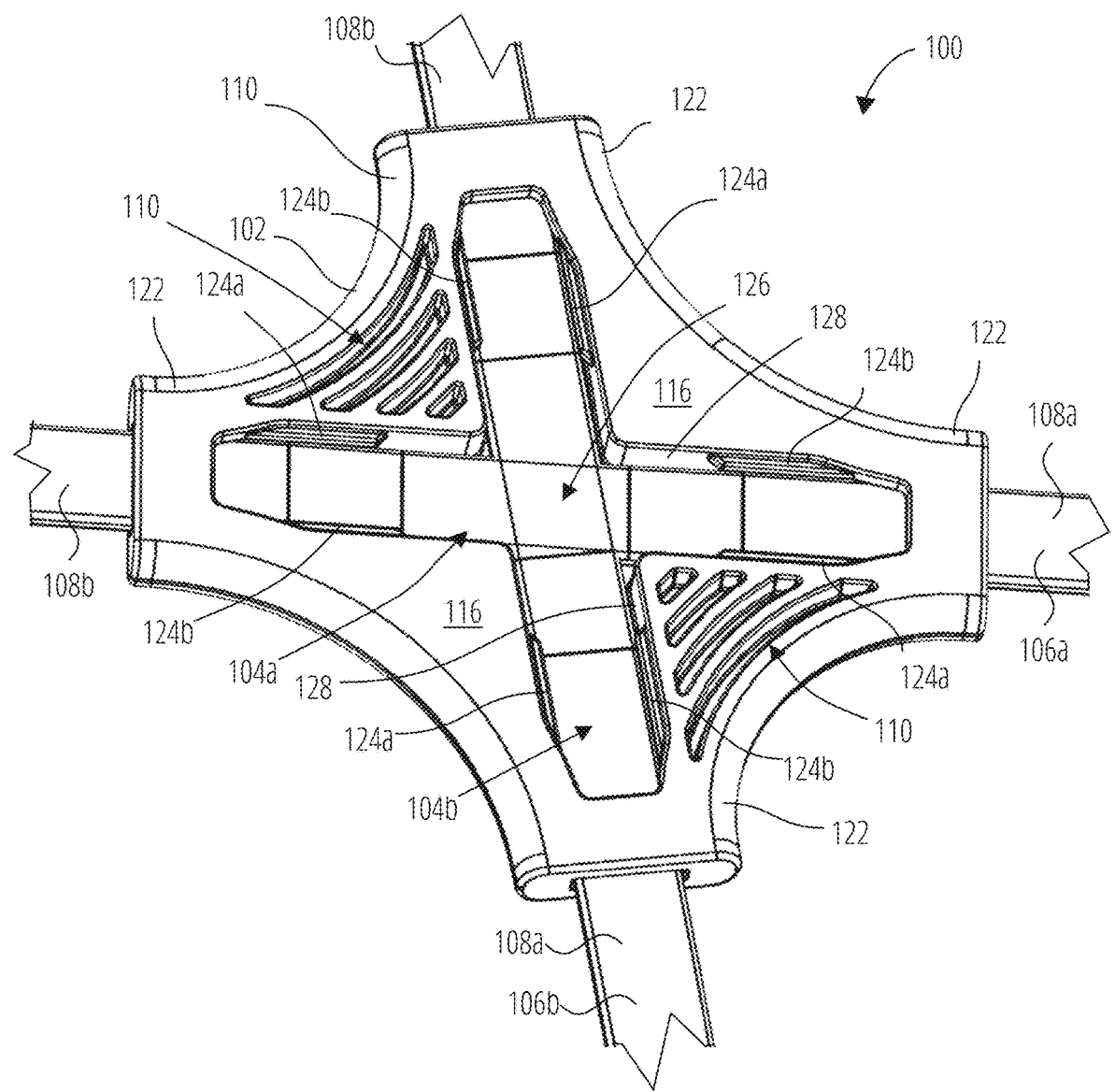
FIG. 1E is a detailed top isometric view of securement device of FIG. 1A.
Figure 1F:
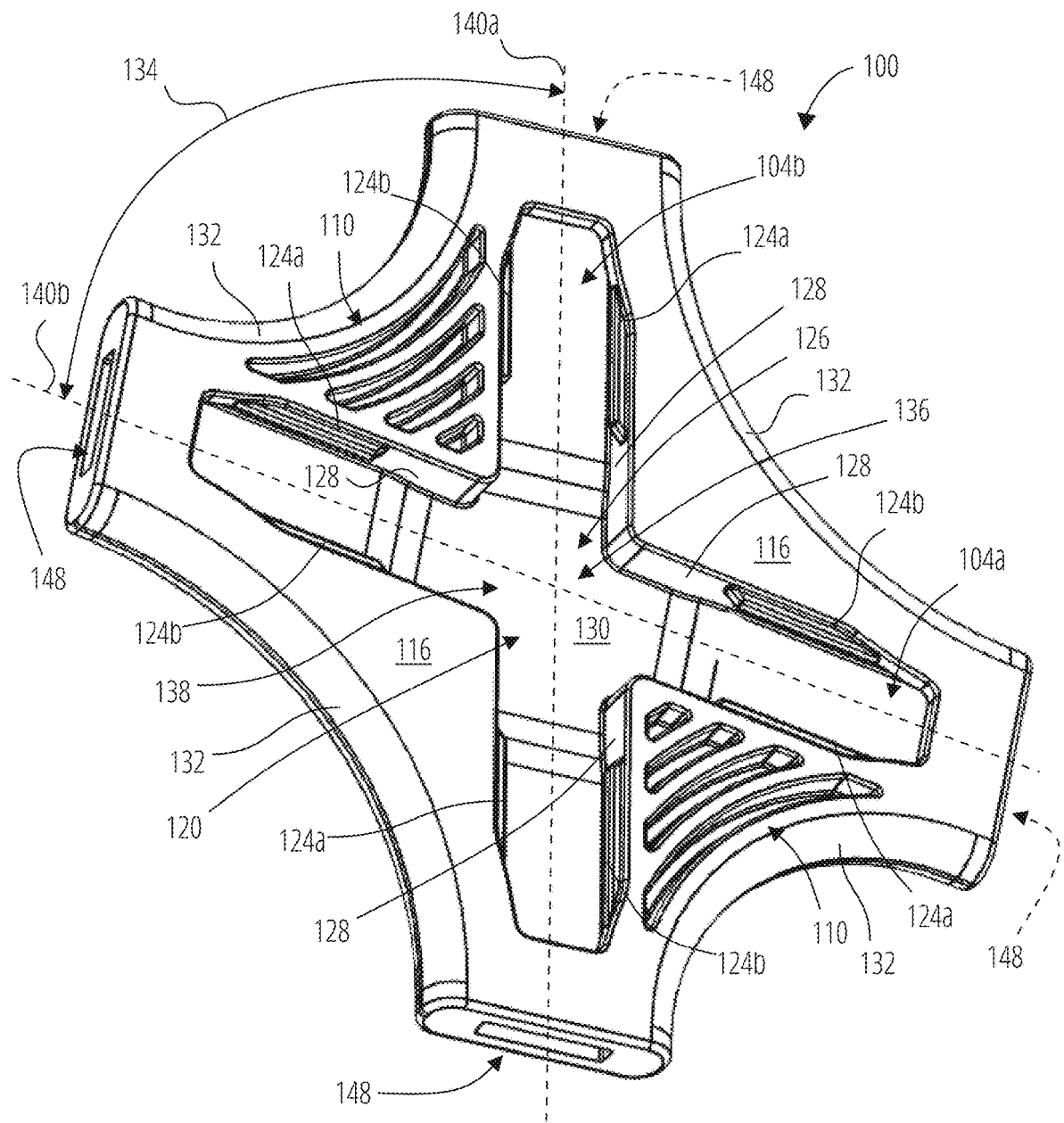
FIG. 1F is another detailed top isometric view of securement device of FIG. 1A.
Figure 1G:
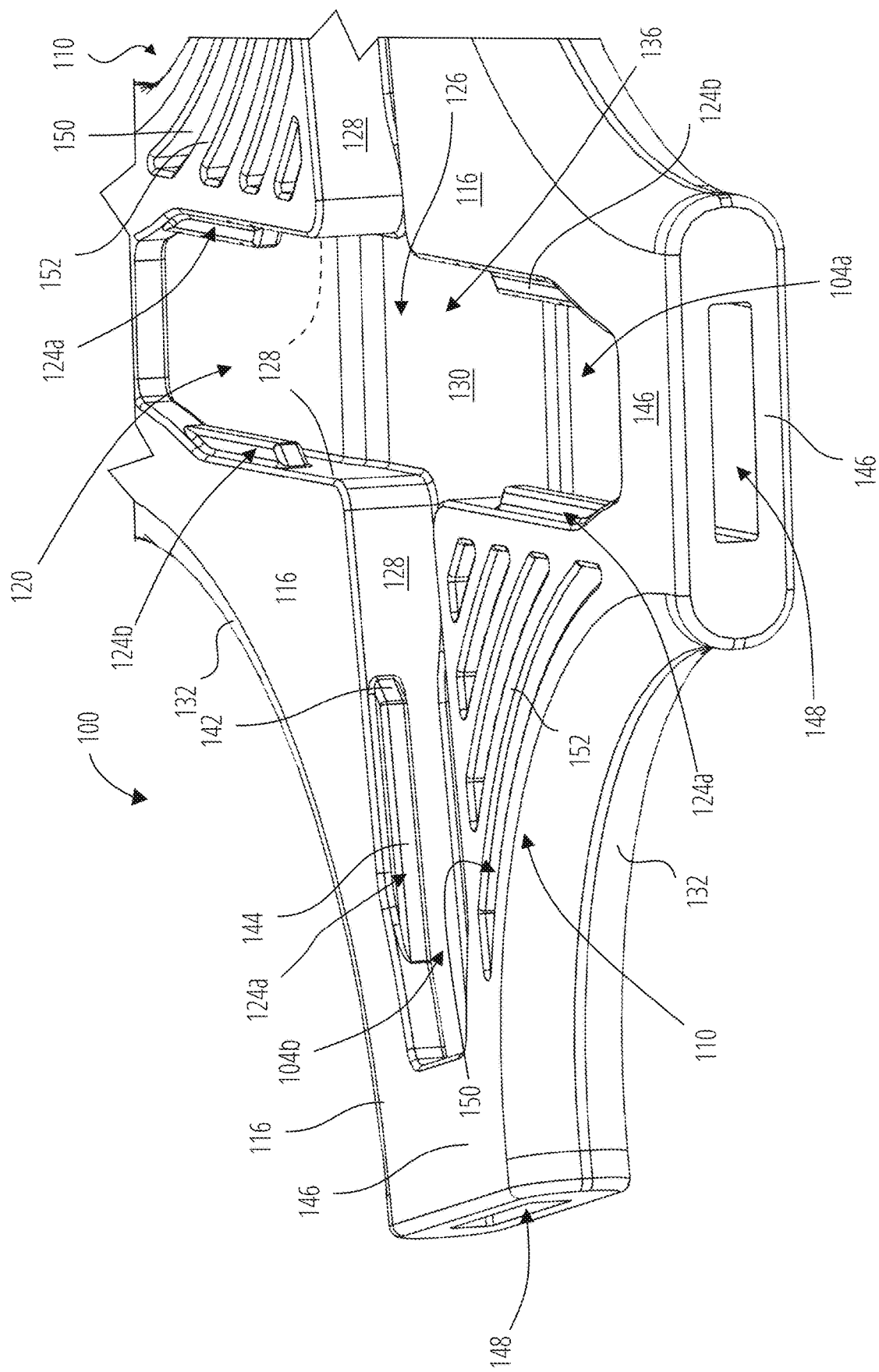
FIG. 1G is a partial, detail isometric view of the securement device of FIG. 1A.
Figure 1H:
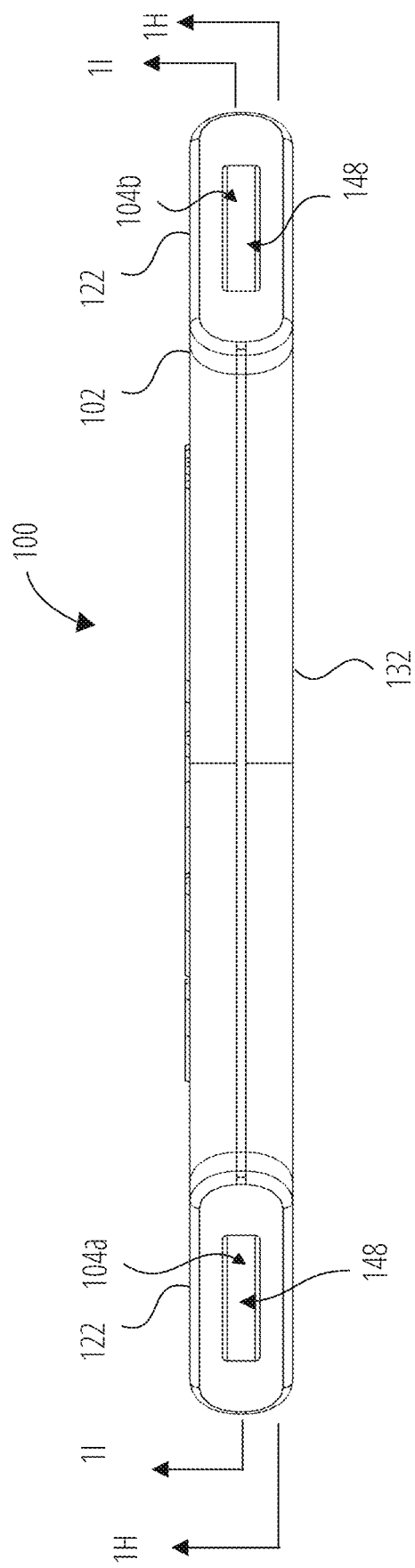
FIG. 1H is a side elevation view of the securement device of FIG. 1A.
Figure 1J:
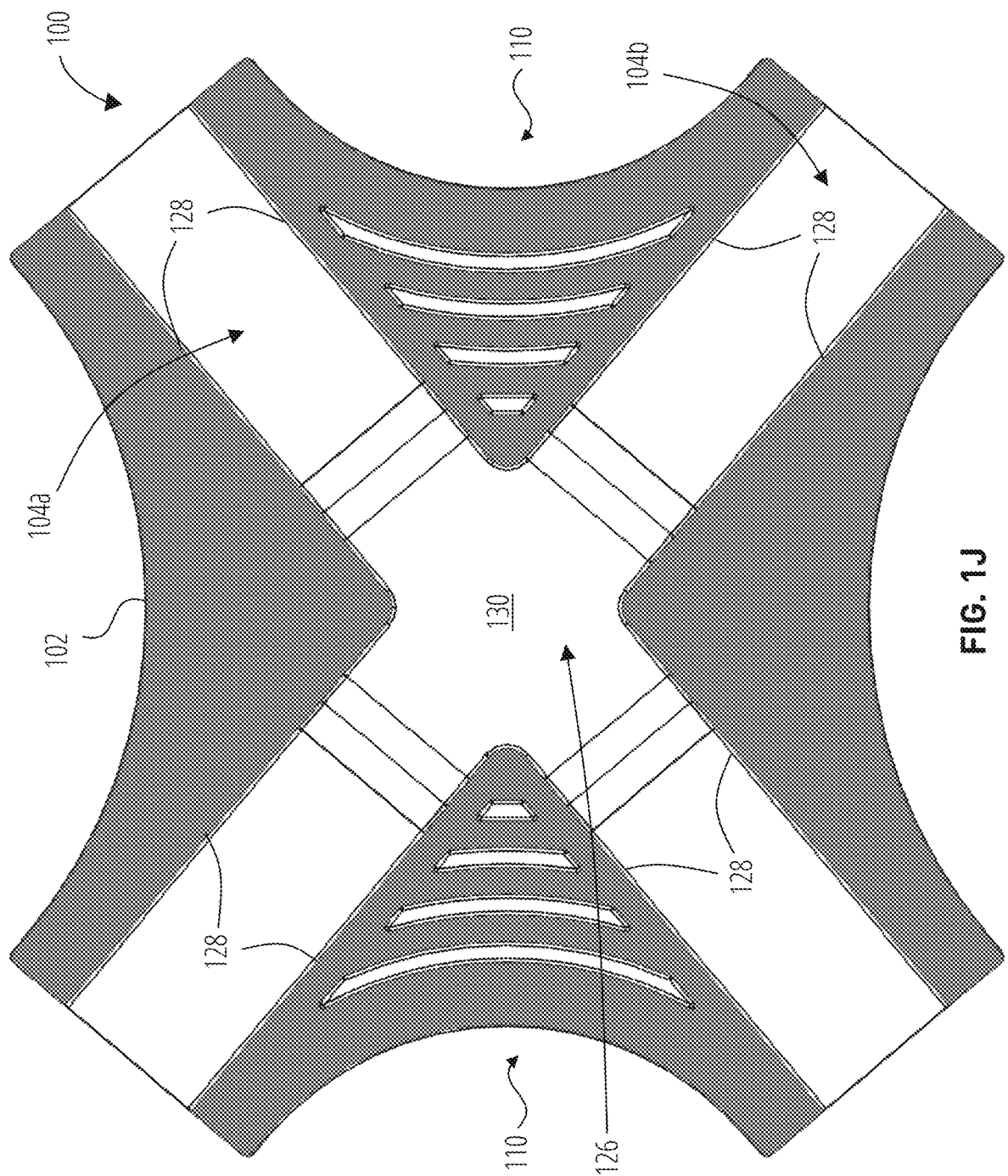
FIG. 1J is a section view of the securement device of FIG. 1A taken along line 1J-1J of FIG. 1H.
Figure 1K:
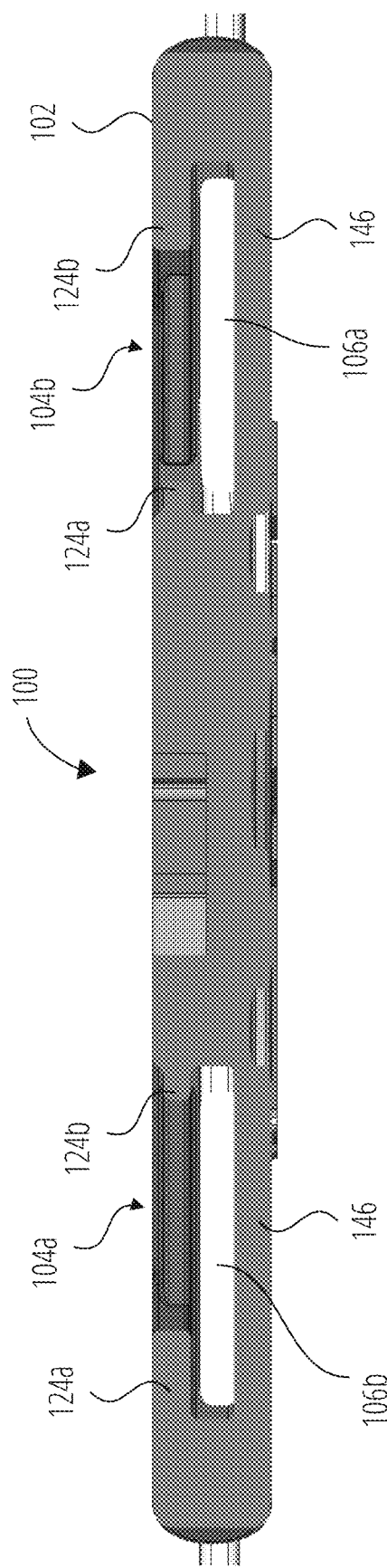
FIG. 1K is a section view of the securement device of FIG. 1A taken along line 1K-1K of FIG. 1D.

With reference to FIG. 1E-FIG. 1G, the restraints 104a-b may be in the form of channels extending along respective channel axes 140a-b through the main body 102. The restraints 104a-b may be formed of a base wall 130 within the main body 102. In some embodiments, the base wall 130 is substantially parallel to one of the top face 116 or the bottom face 118. The base wall 130 may be disposed a distance from either or both of the top face 116 and the bottom face 118. The base wall 130 may be in communication with one or more side walls 128 that also form part of the restraints 104a-b. The side walls 128 may extend at an angle (e.g., 90°) from the base wall 130. One or more side walls 128 and the base wall 130 may intersect at the intersection portion 126 of the main body 102. In some embodiments, the intersection portion 126 is in a central portion 138 of the main body 102. The restraints 104a-b may intersect at the intersection portion 126.

An opening 120 may be formed in the main body 102 such that the restraints 104a-b are in communication with a face (e.g., top face 116 or bottom face 118) of the main body 102. The opening 120 may provide the benefit of facilitating the insertion of the elongated portion 156 of the flexible elements 106a-b through the restraints 104a-b. The base wall 130 and side wall 128 may be open to the area outside the main body 102 via the opening 120.

In some embodiments, the restraints 104a-b may be at an offset angle 134 with respect to one another, such that the restraints 104a-b form an X or + shape. Similarly, the opening 120 may have an X or + shape. The offset angle 134 may be any angle between 0° and 90°. For example, the offset angle 134 may be 10°, 20°, 30°, 40°, 45°, 50°, 60°, 70°, 80°, or 90°. The side walls 128 may form legs of the X or + shape.

Different offset angles 134 may be used to accomplish specific purposes. For example, depending on the structure of the object or vehicle 103 being used to transport the load 101, the offset angle 134 may be varied as desired. In some applications, a securement device 100 may be used to block off part of a vehicle 103 such as a trailer to create a wall. The offset angle 134 may be varies based on the dimensions of the trailer to be blocked off. Additionally, or alternately, the desired centric location of the securement device 100 may be changed depending on the load 101 or the vehicle 103. The range of offset angles 134 may help in increasing and/or decreasing tension where desired by the user. For example, when securing the flexible element 106a-b to attachment locations adjacent to one another, it may be desirable to have a low degree offset angle 134 so as to reduce the amount of tension and/or warp induced on the securement device 100. Changing the offset angle 134 may also influence the location of the main body 102 due to the self-centering element 136. Different offset angles 134 may place the point of equilibrium in different places. Thus, the securement device 100 may provide the benefit of more modularity than other securement devices.

As best shown in FIG. 1G, the restraints 104a-b may include open portions (e.g., at the opening 120), and enclosed portions 146. For example, an enclosed portion may be formed where opposing side walls 128 may be joined to one another by a web portion 146 that extends therebetween. Opposing web portions 146 may be formed in the main body 102 about an aperture 148. The restraints 104a-b may be in communication with the apertures 148 on opposite edges or arms 122 of the main body 102. A first restraint 104a may extend between opposing first and second apertures 148. A second restraint 104b may extend between opposing first and second apertures 148. Thus, a flexible element 106a-b may be received in respective apertures 148, in respective restraints 104a-b and extend through the main body 102 from an edge thereof to an opposing edge. In some embodiments, the web portion 146 extends from the base wall 130 to one of the bottom face 118 or the top face 116. The base walls 130, web portions 146, and side walls 128 thus form a portion of the restraints 104*a-b*.

In some embodiments, flanges 124*a-b* may protrude from the side walls 128 and partially into the opening 120 or the restraints 104*a-b*. Flanges 124*a-b* may be disposed in opposing positions with respect to one another within the restraints 104*a-b*. Flanges 124*a-b* may comprise a rib portion 144 that extends from a side wall 128 into the opening 120. The flanges 124*a-b* may have one or more tapered portions 142 near an end of the rib portions 144. A flange 124*a* depth may recede in a tapered portion 142. The rib portion 144 may vary in length and/or thickness with respect to the type of flexible element 106*a* to be contained within the restraint 104*a*. For example, for thicker flexible elements 106*a*, it may be desirable to have a relatively thin flange 124*a-b*. The tapered portions 142 may aid in the slidability of the flexible element 106*a-b* along the restraint 104*a*, particularly when initially inserting the flexible element 106*a-b* into the restraint 104*a*. For example, the tapered portion 142 may reduce the tendency of the elongated portion 156 of the restraint 104*a* to become snagged on the flange 124*a-b*. The flanges 124*a* may help retain a flexible element 106*a* within a respective restraint 104*a* such as by narrowing the opening 120.

As shown for example, in FIG. 11, opposing flanges 124*a-b* in a restraint 104 may have different lengths. For example the tapered portions 142 of a flange 124*a* and an opposing flange 124*b* may be disposed at an offset 154 from one another. In some embodiments, the flanges 124*a-b* in a restraint 104*a-b* may have flange portions offset by an offset 154, while other flanges in a restraint 104*a-b* are not offset.

As best shown in FIG. 1G, in some embodiments, the main body 102 may have a grip element 110 on one or both of the top face 116 and/or the bottom face 118. Grip elements 110 may be adjacent to any of the restraints 104*a-b*. The grip elements 110 may extend outward from a face of the main body 102, such as the top face 116 or the bottom face 118. The grip element 110 may alternately or additionally extend into the main body 102 from a face such as the top face 116 or the bottom face 118. Grip elements 110 may be formed in a variety of shapes and/or styles such as grip ribs 152 with alternating grip recesses 150, troughs, bumps, and/or other abrasive surfaces. Grip elements 110 may be used to better retain central pressure on the load 101, reduce or prevent slip from the load 101, and/or more effectively grasp the load 101 than if a grip element 110 is not used.

The restraints 104*a-b* may form a self-centering element 136. For example, the self-centering element may include two or more pairs of restraints 104*a-b* at offset angle 126 (see, e.g., FIG. 1F, and as discussed above, for example, the offset angle 134 may be 10°, 20°, 30°, 40°, 45°, 50°, 60°, 70°, 80°, or 90°) with respect to one another and intersecting at an intersection portion 126. By forming the self-centering element 136 from the intersecting restraints 104*a-b*, the tension on a flexible element 106 received in a first of the restraints, e.g., 104*a* may bias the main body 102 to toward an equilibrium position along the flexible element 106 received in the other of the restraints e.g., 104*b* and vice versa. For instance, as the intersection portion 126 of the at least two flexible elements 106*a-b* may be located in the central portion 138 of the securement device, the securement device 100 may automatically slide to the center of the at least four points at which the first portions 108*a* and second portions 108*b* of the flexible elements 106*a-b* attach to the vehicle 103 or other object (e.g., at the attachment structures 114 of the flexible elements 106*a-b*). The base walls 130, side walls 128, web portions 146 and optionally flanges 124*a* may help to secure the securement device 100 from forward and/or backward movement relative to the. The side walls 128 of the restraints 104*a-b* may help to secure the securement device 100 from upwards and/or downwards movement against the flexible elements 106*a-b*.

The flexible elements 106*a* may exert forces on the securement device 100 in directions substantially normal to channel axis 140*a* and channel axis 140*b*. The self-centering element 136 may cause the securement device 100 to automatically center on the load 101 when compressed by the flexible elements 106*a-b*. The securement device 100 may move toward a point of equilibrium on the load 101 based on the forces exerted on the securement device 100 induced by the tension in the flexible elements 106*a-b* (such as tension induced via the length adjusters 112). The point of equilibrium may be based on the number of flexible elements 106*a-b*, the self-centering element 136, and/or respective attachment structures 114, attachment points, the size of the load 101, etc. In some embodiments, the forces exerted on the side walls 128, base walls 130, and web portions 146, the securement device 100 by the flexible elements 106*a-b* may center the securement device 100 based on the locations where the flexible elements 106*a-b* are attached to the vehicle 103 or other object. This self-centering element 136 may result in a securement device 100 that is more capable of retaining location-specific pressure on a load 101 than known securing devices such as straps, chains, ropes, etc. when used without the securement device 100.

The securement device 100 may be used to retain cargo 101 in a variety of situations. In order to effectively retain cargo 101, the securement device 100 may use tension from the flexible elements 106*a* to create pressure and/or friction on the cargo 101. This tension may come from the flexible elements 106*a* being pulled across and/or through the restraints 104*a-b*. Tension may also vary on the attachment structures 114 of respective flexible elements 106*a*. The securement device 100 provides the surprising benefit that while the flexible elements 106*a-b* are un-tensioned, the securement device 100 can be freely positioned along the free dimension (e.g., the first direction 160 and/or second direction 162) of each of the flexible element 106*a-b*. For example, while each flexible element 106*a-b* may have one degree of freedom with respect to the securement device 100, the use of two flexible elements 106*a* and flexible element 106*b*, the securement device 100 has two degrees of freedom with respect to the load 101. As shown in FIG. 1D, for example, the flexible elements 106*a-b* and their respective first direction 160 and second direction 162 may define a coordinate system 158 and the securement device 100 may be freely movable along both the first direction 160 and the second direction 162 with respect to the load 101. For example, one of the flexible elements 106*a* could be able to move in the intersection portion 126 without substantial friction against the flexible element 106*b*. This may allow the main body 102 more easily adapt to different kinds or positions of cargo 101.

A combination of pressure formed by flexible elements 106*a-b* and friction produced the pressure and enhanced by the grip elements 110 may define a non-slip element of the securement device 100. Grip elements 110 may be positioned on respective faces (e.g., the top face 116 and/or the bottom face 118) of the securement device 100, which may lead to a better purchase on the cargo 101. When the flexible elements 106*a-b* are tensioned, the friction forces between the securement device 100 (e.g., the bottom face 118) and the load 101 reduce or prevent the securement device 100 from moving with respect to the load 101 due to the self-centering element 136.

The securement device 100 may additionally or alternately provide an anti-slip element with respect to the load 101 due to interactions between the flexible element 106a and the flexible element 106b. For example, if a channel axis 140a (and thus the flexible element 106a) is located along the first direction 160, movement of the main body 102 in the second direction 162 may be inhibited by tension in the flexible element 106b along the second direction 162. The respective side walls 128 may stop the main body 102 from moving outside the range of motion provided by the tension in the flexible element 106b, and vice versa. In other words, the tension in the flexible element 106a reduces or prevents movement of the flexible element 106b along the second direction 162, and vice versa. With the combination of two or more separate flexible elements 106a-b directed in separate channel axes 140a-b, retention from respective side walls 128 may hinder movement of the securement device 100 with respect to the load 101, when the flexible elements 106a-b are tensioned. These features may reduce slipping on load 101 relative to the vehicle 103 and/or the main body 102.

Thus, the securement device 100 provides the surprising benefit of both being freely adjustable in the coordinate system 158 with respect to a load 101 (e.g., when the flexible elements 106a-b are un-tensioned) and secured to the load 101 when the flexible element 106a-b are tensioned.

To further enhance the ability of the securement device 100 to secure the load 101, an elastic property of the securement device 100 may also allow the main body 102 to conform to the shape of the load 101, therefore increasing the surface area of the securement device 100 in contact with the cargo 101. In addition to the added friction from the grip elements 110, more non-slip elements may stem from tension between the main body 102 and associated flexible elements 106a-b.

In some embodiments, flexible element 106a and or flexible element 106b may be integrated as part of the main body 102. In this example, the at least two flexible elements 106a-b may be retained within their respective restraints 104a-b due to closed web portions 146 that may at least partially encapsulate the elongated portion 156 of the flexible elements 106a-b. The main body 102 and associated flexible elements 106a-b may be a unitary construction.

Figure 2A:
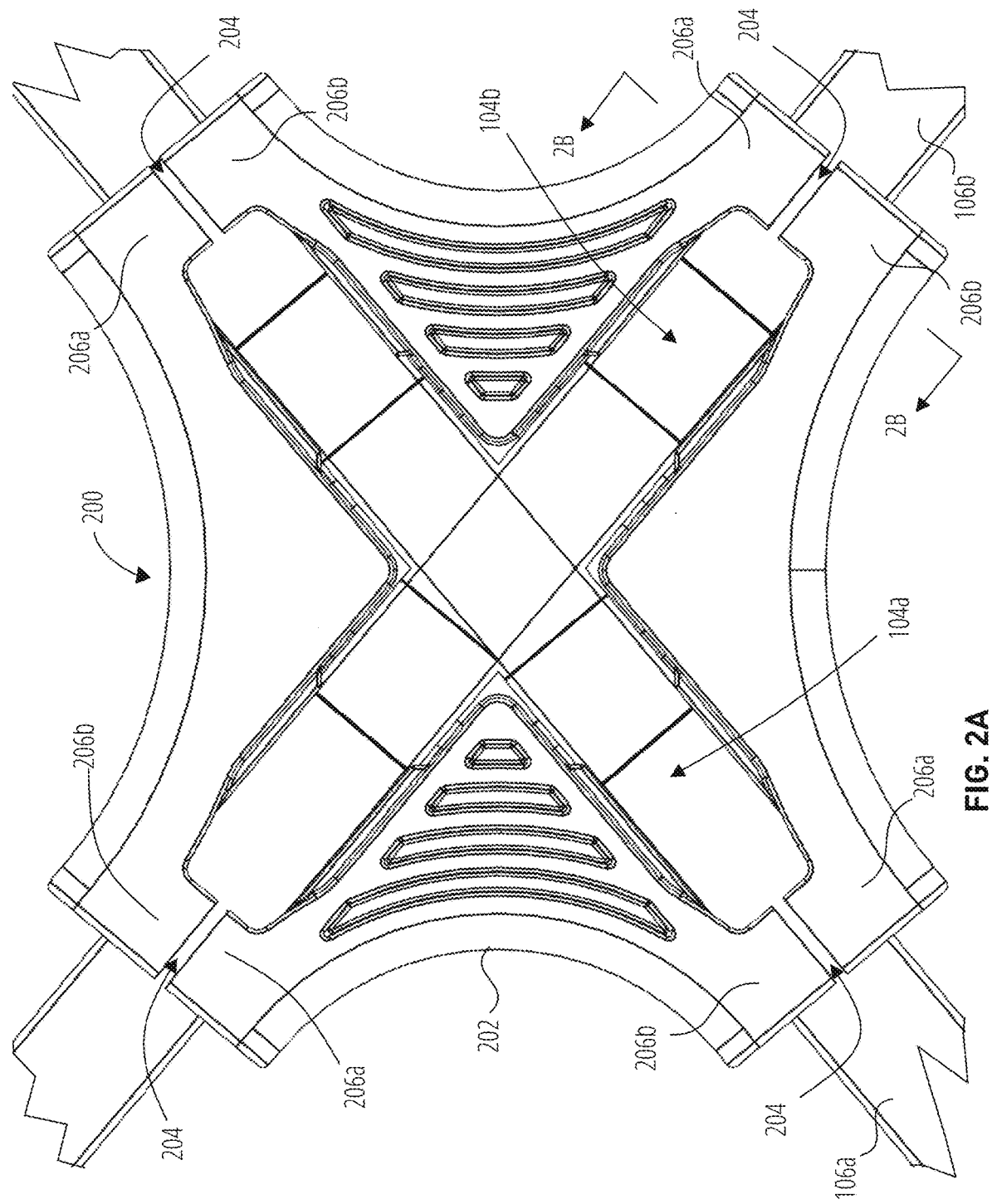
FIG. 2A is a top plan view of an embodiment of a securement device.
Figure 2B:
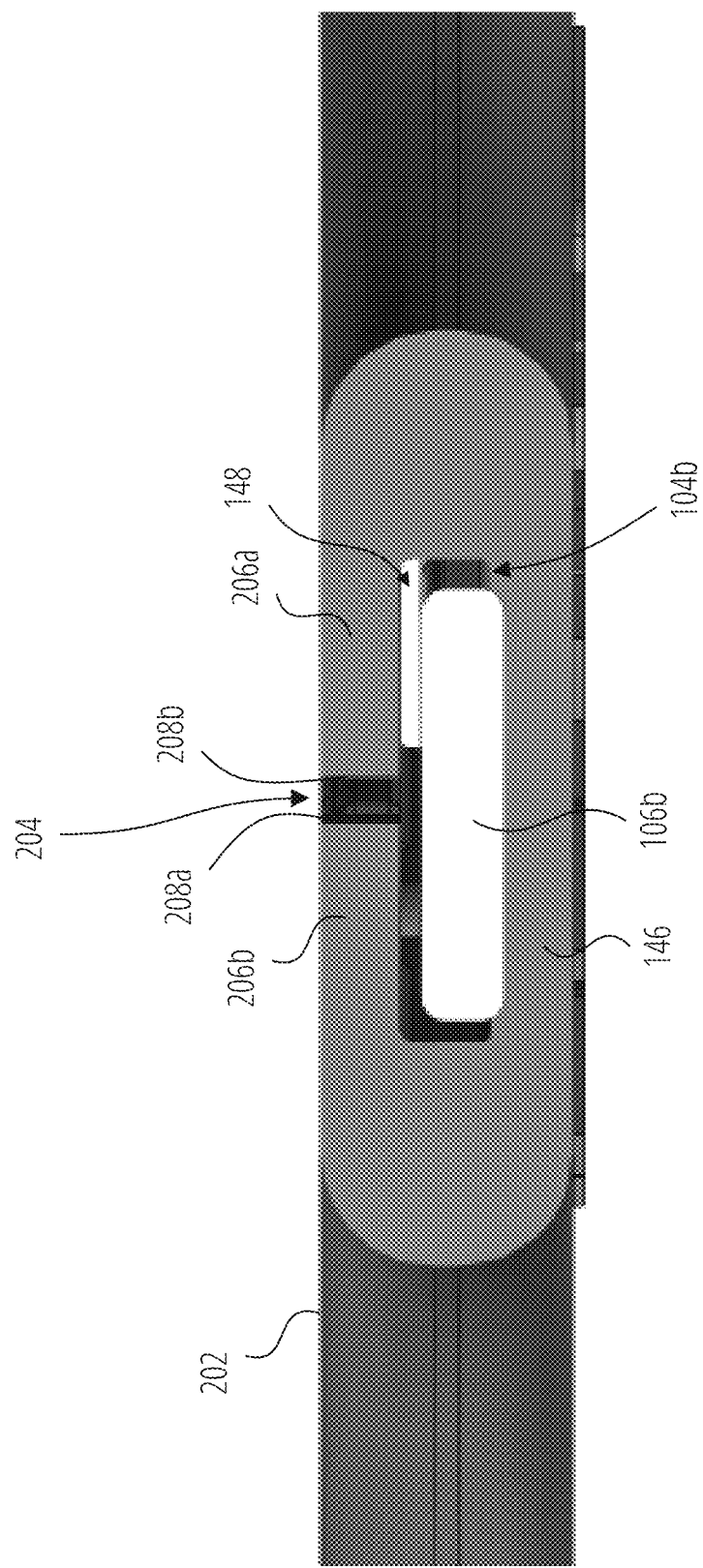
FIG. 2B is a section view of the securement device of FIG. 2A, taken along line 2B-2B of FIG. 2A.
Figure 3A:
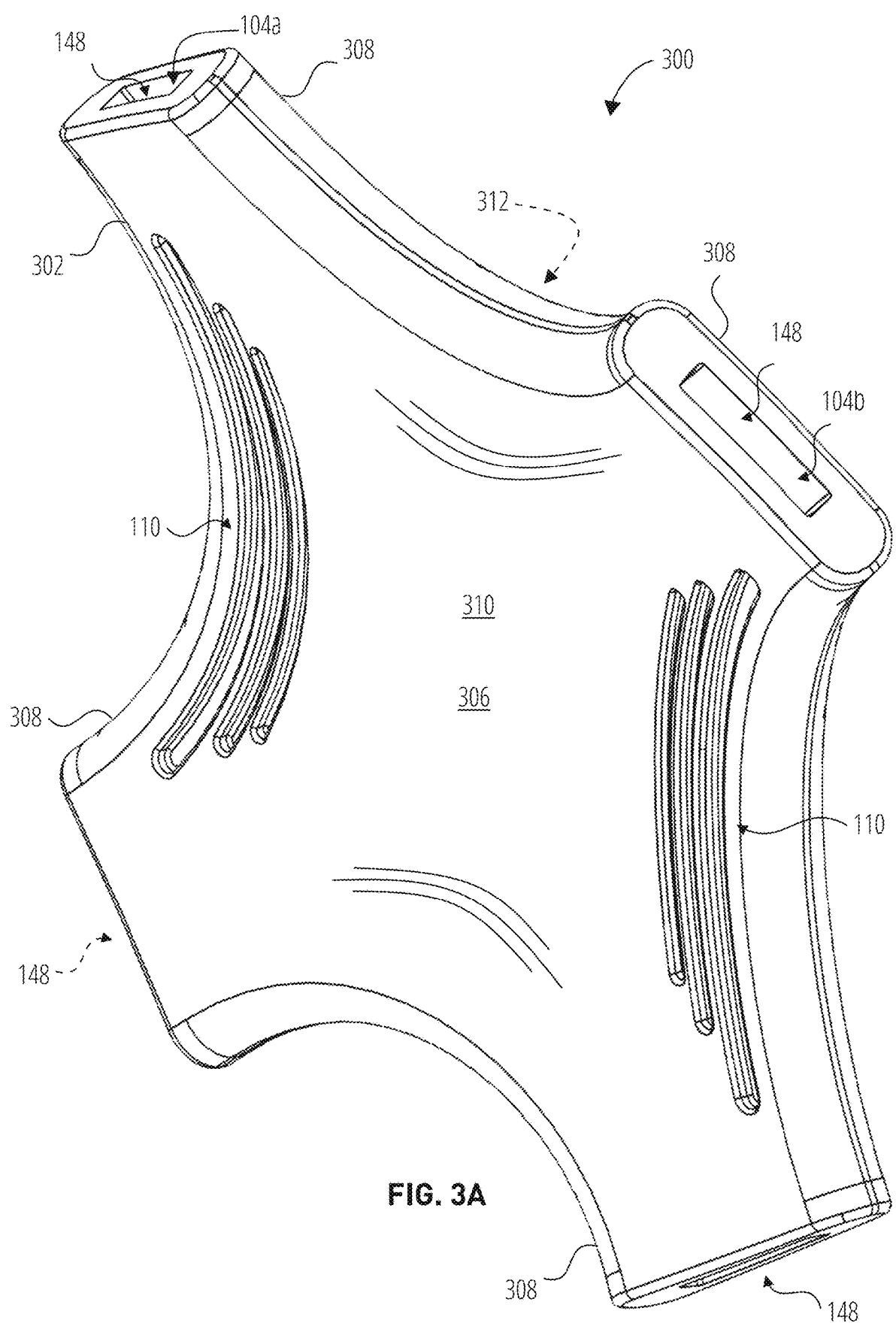
FIG. 3A is a bottom isometric view of an embodiment of a securement device.
Figure 3B:
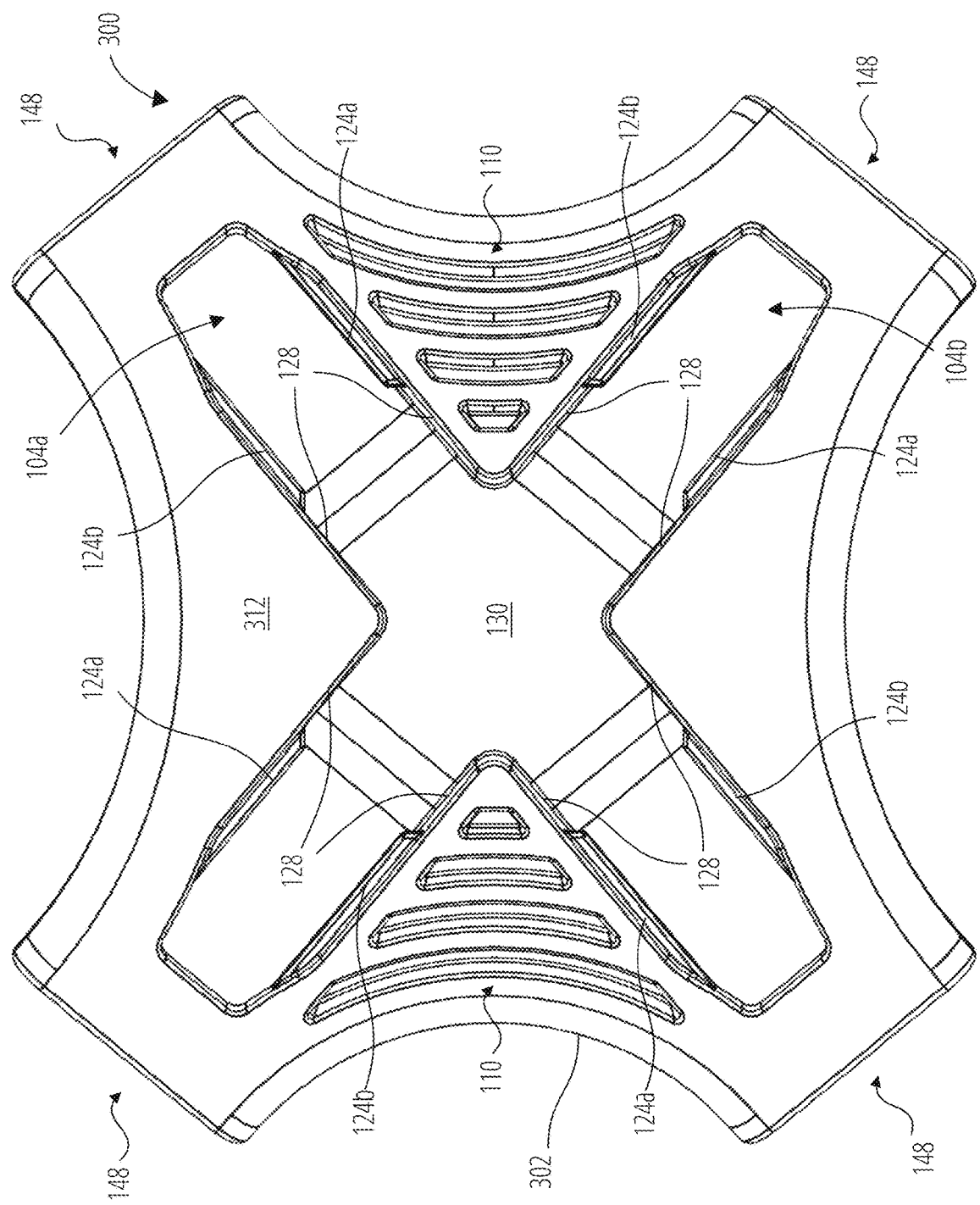
FIG. 3B is a top plan view of the securement device of FIG. 3A.
Figure 3C:
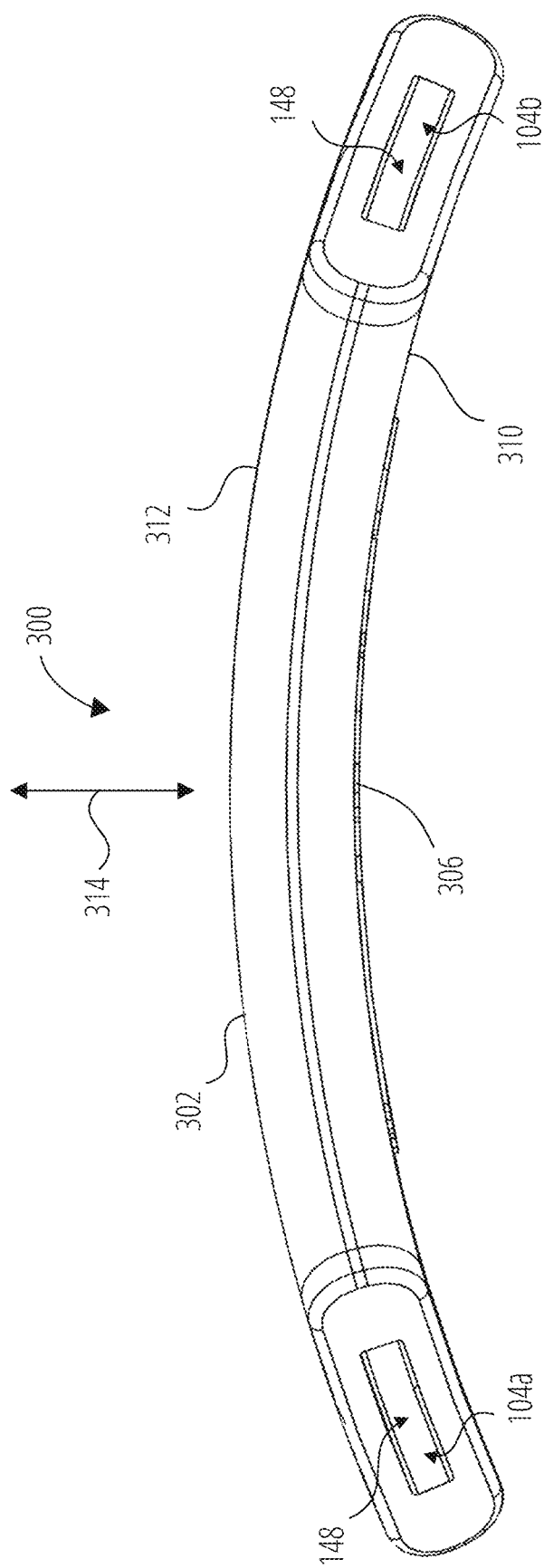
FIG. 3C is a side elevation view of the securement device of FIG. 3A.
Figure 3D:
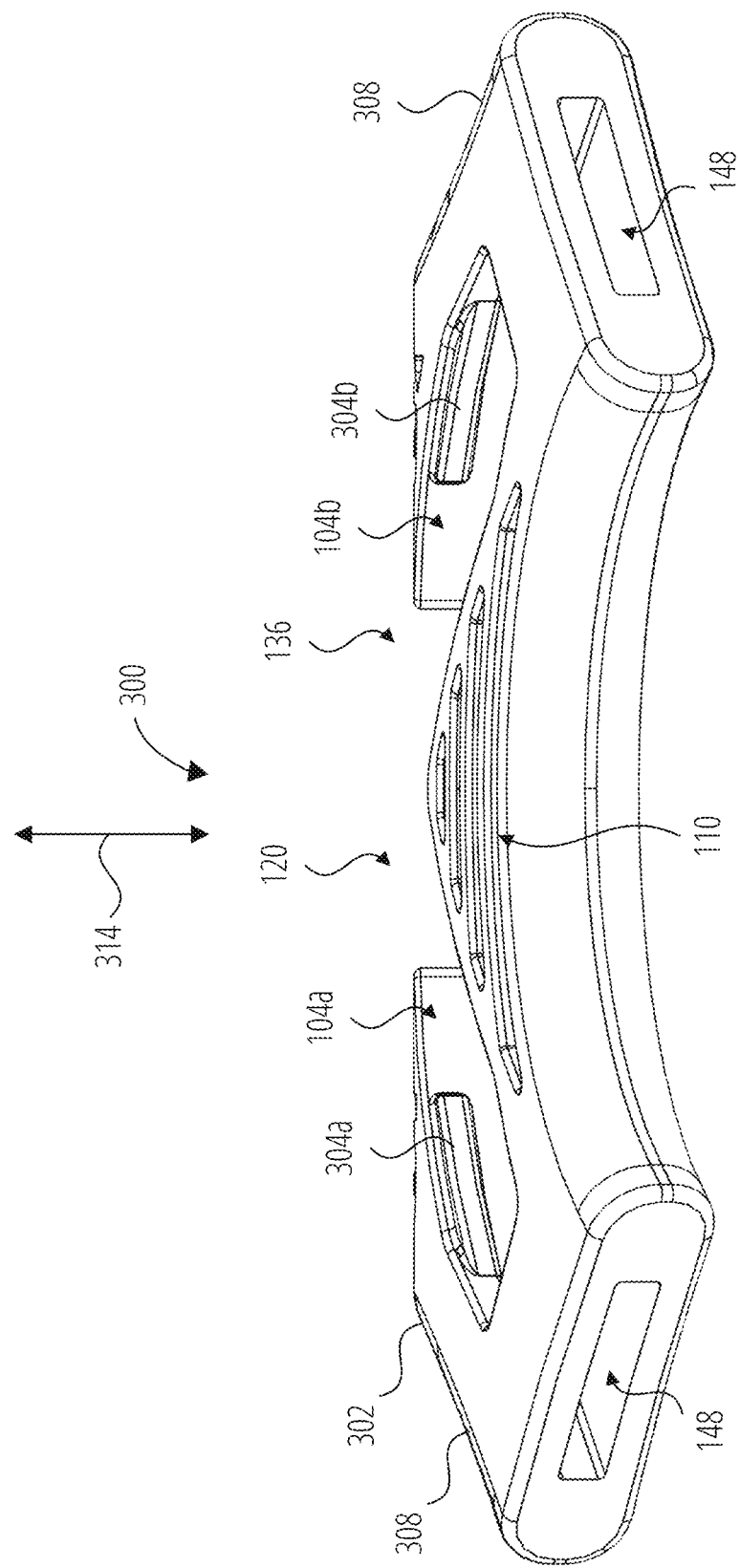
FIG. 3D is side elevation view of the securement device of FIG. 3A, taken 90 degrees from the view of FIG. 3C.

With reference to FIG. 2A and FIG. 2B, a securement device 200 is disclosed. The securement device 200 is similar to the securement device 100 in most aspects and benefits, which are not repeated, for the sake of brevity. The securement device 200 differs from the securement device 100 in that the main body 202 has at least one web portion 146 with a receptacle 204 formed therein. The receptacle 204 may extend from the aperture 148 to a face of the main body 102 (e.g., the top face 116 or the bottom face 118). In some embodiments, the receptacle 204 may form a slit through the web portion. Thus, a web portion of the main body 202 may have a web portion 206a and a web portion 206b opposing one another across the receptacle 204. The distance between the face 208a and the 208b may be adapted to accommodate various sizes of flexible elements 106. For example, the 208a-b may be further apart to accommodate a thicker flexible element 106 and/or may be closer together to accommodate a thinner flexible element 106. The web portion 206a-b may for respective facing faces 208a-b. A benefit of the main body 202 may be the ability to easily insert and/or remove flexible elements 106a-b from the main body 102.

With reference to FIG. 3A through FIG. 3D, an embodiment of a securement device 300 is disclosed. The securement device 200 is similar to the securement device 100 in most aspects and benefits, which are not repeated, for the sake of brevity. Additionally or alternately, the securement device 300 may include the receptacles 204 and related structures of the securement device 200. The securement device 300 may differ from the securement device 100 and the securement device 200 in that the main body 302 may be curved. For example, the bottom face 310 may be concave and the top face 312 may be convex. The bottom face 118 may have an apex 306 formed therein. The main bodies 302 has two or more restraints 304a-b formed therein, therewith, or coupled thereto. The restraints 304a-b are similar in structure and function to the restraints 104a-b described above but are curved along with the main body 302. The arms 308 may also be curved.

The benefits of the securement device 300 may include an ability of the main body 302 to move at least partially in a third direction 314 in addition to the first direction 160 and/or second direction 162 when the flexible elements 106a-b are un-tensioned. The third direction 314 may be orthogonal to the coordinate system 158. Additionally, or alternatively, the securement device 300 may more readily find an equilibrium point on the load 101 due to the apex 306. The securement device 300 may further prevent or reduce movement of the main body 302 with respect to the load 101 or the vehicle 103 when the flexible elements 106a-b are tensioned.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A securement device comprising:
   a main body including:
      a first channel including a first base wall and first side walls extending from the first base wall to an exterior face of the main body and defined in the main body,
      a second channel including a second base wall and second side walls extending from the second base wall to the exterior face of the main body and defined in the main body,
   wherein:
      the first channel and the second channel are disposed along separate respective and intersecting first and second channel axes, wherein each of the first and second channels and respective axes each extend through the main body,
      the first channel is adapted to receive a first flexible element, the first flexible element slidable in the first channel along the first channel axis,
      the second channel is adapted to receive a second flexible element, the second flexible element slidable in the second channel along the second channel axis,
      the first channel and the second channel intersect at an intersection portion, and
      the first side walls intersect adjacent second side walls intersect at the intersection portion.

2. The securement device of claim 1, wherein the first channel and the second channel include, at least in part, a web portion extending between opposing first side walls and opposing second side walls.

3. The securement device of claim 2, wherein the main body further comprises a self-centering element, wherein the self-centering element automatically biases the main body toward an equilibrium position when the first flexible element and the second flexible element are tensioned.

4. The securement device of claim 3, wherein the self-centering element comprises the first side walls and the first base wall, the second side walls and the second base wall, and the web portions.

5. The securement device of claim 1, wherein the main body further comprises a plurality of arms extending from a central portion thereof.

6. The securement device of claim 5, wherein the first channel extends through a first pair of arms of the plurality of arms and the second channel extends through a second pair of the plurality of arms.

7. The securement device of claim 6, wherein the main body further comprises a transition portion that connects from a first arm in the first pair of arms to an adjacent first arm in the second pair or arms.

8. The securement device of claim 5, wherein an opening is defined by the main body to expose at least a portion of the first channel and the second channel at the plurality of arms.

9. The securement device of claim 1, wherein the intersection portion is adapted such that the flexible elements at least partially overlap inside the intersection portion.

10. The securement device of claim 1, wherein the main body further comprises a first flange that protrudes at least partially into at least one of the first channel or the second channel from a side wall thereof.

11. The securement device of claim 10, wherein a second flange protrudes at least partially into the at least one of the first channel or the second channel from a side wall thereof in a position opposing the first flange.

12. The securement device of claim 1, wherein the first and second channels include an open portion and an enclosed portion, wherein the enclosed portion is disposed at an end portion of the respective channels.

13. The securement device of claim 12, wherein at least one enclosed portion further comprises a receptacle slit formed therein and adapted to receive one of the first flexible element or the second flexible element.

14. The securement device of claim 1, wherein the first channel limits movement of the main body with respect to the first flexible element to a first direction along the first axis, and the second channel limits movement of the main body with respect to the second flexible element to a second direction along the second axis.

15. The securement device of claim 14, wherein the first direction and the second direction define a coordinate plane and the main body is moveable in at least two degrees of freedom in the coordinate plane when the first flexible element and the second flexible element are un-tensioned.

16. The securement device of claim 15, wherein when the first flexible element is tensioned in the first direction, the tension reduces movement of the second flexible element along the second direction.

17. The securement device of claim 1, wherein:
   the first flexible element and the second flexible element are coupled to a secondary object,
   the securement device secures a load against the secondary object, and the first channel and the second channel are disposed such that when tension is applied to the first flexible element received in the first channel and the second flexible element received in the second channel, and the main body is placed in contact with the load, the securement device self-centers on the load to securely couple the load to the secondary object.

18. The securement device of claim 1, wherein:

an opening is defined by the main body to expose at least the intersection portion, and the first flexible element and the second flexible element are insertable to either the first channel or the second channel through the opening.

19. A securement device comprising:

a main body including:
- a first channel defined by the main body and including, at least in part, a first base wall, first side walls extending from the first base wall to an exterior face of the main body, and a first web portion extending between opposing first side walls; and
- a second channel defined by the main body and including, at least in part, a second base wall, second side walls extending from the second base wall to the exterior face of the main body, and a second web portion extending between opposing second side walls;

wherein:
- the first channel and the second channel each extend through the main body and each define intersecting axes,
- at least one web portion has a receptacle formed therein and adapted to receive a flexible element slidable in a direction along at least one of the intersecting axes,
- the first channel and the second channel intersect at an intersection portion, and
- the first side walls intersect adjacent second side walls intersect at the intersection portion.

20. A securement device comprising:

a pre-curved main body, the curvature defined relative to a first plane, including:
- a first channel defined by the main body and extending along at least a first axis extending along a second plane orthogonal to the first plane and along the curved main body and including, at least in part, a first base wall, first side walls extending from the first base wall to an exterior face of the main body, and a first web portion extending between opposing first side walls; and
- a second channel defined by the main body and extending along at least a second axis extending along the second plane and through the curved main body and intersecting the first axis and including, at least in part, the base wall, the one or more respective side walls, and a second web portion extending between opposing second side walls;

wherein:
- the first channel is adapted to receive a first flexible element slidable in the first channel along at least the first channel axis,
- the second channel is adapted to receive a second flexible element slidable in the second channel along at least the second channel axis,
- the first channel and the second channel intersect at an intersection portion, and
- the first side walls intersect adjacent second side walls intersect at the intersection portion.

* * * * *